(12) United States Patent
Zhamu et al.

(10) Patent No.: US 10,930,924 B2
(45) Date of Patent: *Feb. 23, 2021

(54) CHEMICAL-FREE PRODUCTION OF SURFACE-STABILIZED LITHIUM METAL PARTICLES, ELECTRODES AND LITHIUM BATTERY CONTAINING SAME

(71) Applicant: Global Graphene Group, Inc., Dayton, OH (US)

(72) Inventors: Aruna Zhamu, Springboro, OH (US); Bor Z. Jang, Centerville, OH (US)

(73) Assignee: Global Graphene Group, Inc., Dayton, OH (US)

( * ) Notice: Subject to any disclaimer, the term of this patent is extended or adjusted under 35 U.S.C. 154(b) by 174 days.

This patent is subject to a terminal disclaimer.

(21) Appl. No.: 16/042,376

(22) Filed: Jul. 23, 2018

(65) Prior Publication Data

US 2020/0028158 A1    Jan. 23, 2020

(51) Int. Cl.
     *H01M 4/36*      (2006.01)
     *H01M 10/0525*      (2010.01)
     (Continued)

(52) U.S. Cl.
     CPC ............ *H01M 4/364* (2013.01); *H01G 11/06* (2013.01); *H01G 11/32* (2013.01); *H01G 11/74* (2013.01);
     (Continued)

(58) Field of Classification Search
     CPC ..................................................... H01M 4/364
     See application file for complete search history.

(56) References Cited

U.S. PATENT DOCUMENTS

| 2,798,878 A | 7/1957 | Hummers |
| 6,872,330 B2 | 3/2005 | Mack et al. |

(Continued)

FOREIGN PATENT DOCUMENTS

CN      108043242 A      5/2018

OTHER PUBLICATIONS

PCT/US19/42901 International Search Report and Written Opinion dated Nov. 11, 2019, 10 pages.

(Continued)

*Primary Examiner* — Maria Laios

(57) ABSTRACT

Provided is a simple, fast, scalable, and environmentally benign method of producing graphene-stabilized lithium metal particles, comprising: a) mixing particles of a graphitic material, polymer-coated particles of a lithium-attracting seed material, and optional ball-milling media to form a mixture in an impacting chamber of an energy impacting apparatus; b) operating the apparatus with a frequency and an intensity for a length of time sufficient for peeling off graphene sheets from particles of graphitic material and transferring the peeled graphene sheets to surfaces of the polymer-coated particles and fully encapsulate the particles to produce graphene-encapsulated polymer-coated solid particles; c) recovering the graphene-encapsulated polymer-coated solid particles from the impacting chamber and removing the polymer from the particles to produce graphene balls, wherein the graphene ball has a graphene shell, a lithium-attracting seed material particle and a hollow space; and d) impregnating the graphene balls with lithium metal.

17 Claims, 6 Drawing Sheets

(51) Int. Cl.
- *H01M 4/38* (2006.01)
- *H01G 11/32* (2013.01)
- *H01G 11/06* (2013.01)
- *H01G 11/74* (2013.01)
- *H01M 4/587* (2010.01)
- *H01M 4/02* (2006.01)

(52) U.S. Cl.
CPC ............ *H01M 4/382* (2013.01); *H01M 4/587* (2013.01); *H01M 10/0525* (2013.01); *H01M 2004/027* (2013.01)

(56) References Cited

U.S. PATENT DOCUMENTS

| | | | |
|---|---|---|---|
| 7,071,258 | B1 | 7/2006 | Jang et al. |
| 7,327,000 | B2 | 2/2008 | DeHeer et al. |
| 9,597,657 | B1 | 3/2017 | Zhamu et al. |
| 9,899,672 | B2 * | 2/2018 | Zhamu .................. H01M 4/366 |
| 2005/0271574 | A1 | 12/2005 | Jang et al. |
| 2008/0048152 | A1 | 2/2008 | Jang et al. |
| 2017/0158513 | A1 | 6/2017 | Zhamu et al. |
| 2017/0166722 | A1 | 6/2017 | Zhamu et al. |
| 2017/0182474 | A1 | 6/2017 | Zhamu et al. |
| 2017/0194105 | A1 | 7/2017 | Zhamu et al. |
| 2017/0225233 | A1 | 8/2017 | Zhamu et al. |
| 2017/0338472 | A1 | 11/2017 | Zhamu et al. |
| 2017/0352868 | A1 | 12/2017 | Zhamu et al. |

OTHER PUBLICATIONS

Yang et al., "Two-dimensional Graphene Nano-ribbons" J. Am. Chem. Soc. (2008) vol. 130, pp. 4216-4217.

Anderson et al., "The Use of Esters of N-Hydroxysuccinimide in Peptide Synthesis" J. Amer. Chem. Soc. (1964) vol. 86, No. 9, pp. 1839-1842.

Hummers, "Preparation of graphitic oxide" J. Am. Chem. Soc. (1958) vol. 80, p. 1339.

Jang et al., "Processing of Nano Graphene Platelets (NGPs) and NGP Nanocomposites: A Review" J. Materials Sci. (2008) vol. 43, pp. 5092-5101.

* cited by examiner

CHEMICAL-FREE PRODUCTION OF SURFACE-STABILIZED LITHIUM METAL PARTICLES, ELECTRODES AND LITHIUM BATTERY CONTAINING SAME

FIELD OF THE INVENTION

The present invention relates generally to the field of lithium batteries and, in particular, to an environmentally benign and cost-effective method of producing graphene-protected lithium metal particles for lithium batteries.

BACKGROUND

Rechargeable lithium-ion (Li-ion) and lithium metal batteries (e.g. Li-sulfur, Li metal-air, and lithium-metal oxide batteries) are considered promising power sources for electric vehicle (EV), hybrid electric vehicle (HEV), and portable electronic devices, such as lap-top computers and mobile phones. Lithium as a metal element has the highest capacity (3,861 mAh/g) compared to any other metal. Hence, in general, Li metal batteries have a significantly higher energy density than lithium ion batteries. Similarly, Na metal batteries have a higher energy than corresponding sodium ion batteries.

Historically, rechargeable lithium metal batteries were produced using non-lithiated compounds, such as $TiS_2$, $MoS_2$, $MnO_2$, $COO_2$, and $V_2O_5$, as the cathode active materials, coupled with a lithium metal anode. When the battery was discharged, lithium ions were transferred from the lithium metal anode through the electrolyte to the cathode, and the cathode became lithiated. Unfortunately, upon repeated charges/discharges, the lithium metal resulted in the formation of dendrites at the anode that ultimately grew to penetrate through the separator, causing internal shorting and explosion. As a result of a series of accidents associated with this problem, the production of these types of secondary batteries was stopped in the early 1990's.

To overcome these safety issues, several alternative approaches were proposed in which either the electrolyte or the anode was modified. The first approach involves replacing Li metal by graphite (a Li insertion material) as the anode. The operation of such a battery involves shuttling Li ions between two Li insertion compounds at the anode and the cathode, respectively; hence, the name "Li-ion battery." Presumably because of the presence of Li in its ionic rather than metallic state, Li-ion batteries are inherently safer than Li-metal batteries. The second approach entails replacing the liquid electrolyte by a dry polymer electrolyte, leading to the Li solid polymer electrolyte (Li-SPE) batteries. However, Li-SPE has seen very limited applications since it typically requires an operating temperature of up to 80° C. The third approach involves the use of a solid electrolyte that is presumably resistant to dendrite penetration, but the solid electrolyte normally exhibits excessively low lithium-ion conductivity at room temperature. Alternative to this solid electrolyte approach is the use of a rigid solid protective layer between the anode active material layer and the separator layer to stop dendrite penetration, but this typically ceramic material-based layer also has a low ion conductivity and is difficult and expensive to make and to implement in a lithium metal battery. Furthermore, the implementation of such a rigid and brittle layer is incompatible with the current lithium battery manufacturing process and equipment.

Although lithium-ion (Li-ion) batteries are promising energy storage devices for electric drive vehicles, state-of-the-art Li-ion batteries have yet to meet the cost and performance targets. Li-ion cells typically use a lithium transition-metal oxide or phosphate as a positive electrode (cathode) that de/re-intercalates $Li^+$ at a high potential with respect to the carbon negative electrode (anode). The specific capacity of graphite anode is <372 mAh/g and that of lithium transition-metal oxide or phosphate based cathode active material is typically in the range from 140-200 mAh/g. As a result, the specific energy of commercially available Li-ion cells is typically in the range from 120-220 Wh/kg, most typically 150-180 Wh/kg. These specific energy values are two to three times lower than what would be required for battery-powered electric vehicles to be widely accepted.

With the rapid development of hybrid (HEV), plug-in hybrid electric vehicles (HEV), and all-battery electric vehicles (EV), there is an urgent need for anode and cathode materials that provide a rechargeable battery with a significantly higher specific energy, higher energy density, higher rate capability, long cycle life, and safety. Among various advanced energy storage devices, alkali metal batteries, including Li-air (or Li—$O_2$), Li—S, and Li—Se batteries, are especially attractive due to their high specific energies.

The Li—$O_2$ battery is possibly the highest energy density electrochemical cell that can be configured today. The Li—$O_2$ cell has a theoretic energy density of 5.2 kWh/kg when oxygen mass is accounted for. A well configured Li—$O_2$ battery can achieve an energy density of 3,000 Wh/kg, 15-20 times greater than those of Li-ion batteries. However, current Li—$O_2$ batteries still suffer from poor energy efficiency, poor cycle efficiency, and dendrite formation and penetration issues.

One of the most promising energy storage devices is the lithium-sulfur (Li—S) cell since the theoretical capacity of Li is 3,861 mAh/g and that of S is 1,675 mAh/g. In its simplest form, a Li—S cell consists of elemental sulfur as the positive electrode and lithium as the negative electrode. The lithium-sulfur cell operates with a redox couple, described by the reaction $S_8+16Li \leftrightarrow 8Li_2S$ that lies near 2.2 V with respect to $Li+/Li^0$. This electrochemical potential is approximately ⅔ of that exhibited by conventional positive electrodes (e.g. $LiMnO_4$). However, this shortcoming is offset by the very high theoretical capacities of both Li and S. Thus, compared with conventional intercalation-based Li-ion batteries, Li—S cells have the opportunity to provide a significantly higher energy density (a product of capacity and voltage). Assuming complete reaction to $Li_2S$, energy densities values can approach 2,500 Wh/kg and 2,800 Wh/l, respectively, based on the combined Li and S weights or volumes. If based on the total cell weight or volume, the energy densities can reach approximately 1,000 Wh/kg and 1,100 Wh/l, respectively. However, the current Li-sulfur cells reported by industry leaders in sulfur cathode technology have a maximum cell specific energy of 250-350 Wh/kg (based on the total cell weight), which is far below what is possible. In summary, despite its great potential, the practical realization of the Li—S battery has been hindered by several obstacles, such as dendrite-induced internal shorting, low active material utilization efficiency, high internal resistance, self-discharge, and rapid capacity fading on cycling. These technical barriers are due to the poor electrical conductivity of elemental sulfur, the high solubility of lithium polysulfides in organic electrolyte (which migrate to the anode side, resulting in the formation of inactivated $Li_2S$ in the anode), and Li dendrite formation and penetration. The most serious problem of Li metal secondary (rechargeable) batteries remains to be the dendrite formation and penetration.

SUMMARY OF THE INVENTION

The present invention provides a strikingly simple, fast, scalable, environmentally benign, and cost-effective method of producing graphene-embraced (graphene-encapsulated) lithium metal particles for a wide variety of batteries. This method meets the aforementioned needs. This method entails producing single-layer or few layer graphene sheets directly from a graphitic or carbonaceous material (a graphene source material such as a graphite particle) and immediately transferring these isolated (peeled-off) graphene sheets onto surfaces of polymer-coated metal particles to form graphene-embraced or graphene-encapsulated composite particles. The polymer is then removed (e.g. burned off or dissolved by a solvent) and the resulting empty space between the embracing graphene sheets and the metal particle is then filled with lithium metal. In an embodiment, the graphitic material or carbonaceous material has never been intercalated, oxidized, or exfoliated and does not include previously produced isolated graphene sheets.

In certain embodiments, the invention provides a method of producing graphene-stabilized lithium metal particles directly from a graphitic material, the method comprising:

a) mixing multiple particles of a graphitic material, multiple polymer-coated solid particles of a lithium-attracting seed material (e.g. a Ag, Au, Ti, Mg, or Zn metal or a metalloid such as Si and Ge), and optional ball-milling media to form a mixture in an impacting chamber of an energy impacting apparatus (e.g. a ball mill), wherein the impacting chamber contains therein no previously produced isolated graphene sheets;

b) operating the energy impacting apparatus with a frequency and an intensity for a length of time sufficient for peeling off graphene sheets from the particles of graphitic material and transferring the peeled graphene sheets to surfaces of the polymer-coated particles and fully embrace or encapsulate the particles to produce graphene-embraced or graphene-encapsulated polymer-coated solid particles inside the impacting chamber;

c) recovering the graphene-embraced or graphene-encapsulated polymer-coated solid particles from the impacting chamber and removing the polymer from the particles to produce graphene balls, wherein at least a graphene ball has a graphene shell, a lithium-attracting seed material particle and a hollow space enclosed by the graphene shell; and d) impregnating the graphene balls with lithium metal to obtain the graphene-stabilized lithium metal particles.

In the invented method, the graphitic material may be selected from natural graphite, synthetic graphite, highly oriented pyrolytic graphite, graphite fiber, graphitic nanofiber, graphite fluoride, chemically modified graphite, mesocarbon microbead, partially crystalline graphite, or a combination thereof.

The method may further comprise a step of incorporating the graphene-stabilized lithium metal particles into a battery electrode or lithium-ion capacitor electrode.

In some embodiments, the lithium-attracting seed material is selected from a metal, a metalloid, carbon, graphite, metal oxide, or a combination thereof. The metal oxide may be selected from $SiO_x$ (0.1<x<1.9), GeO, $SnO_2$, or a transition metal oxide. In some preferred embodiments, the lithium-attracting seed material contains a metal selected from Au, Ag, Mg, Zn, Ti, Na, K, Al, Fe, Mn, Co, Ni, V, Cr, an alloy thereof, or a combination thereof. The lithium-attracting seed material may also contain a metalloid selected from Si, Ge, Sn, Pb, B, Al, Ga, In, Sb, Bi, or a combination thereof.

In some embodiments, the step of removing the polymer coating from the underlying lithium-attracting seed material particles comprises a procedure selected from melting the polymer, dissolving the polymer with a solvent, or heat-treating/pyrolyzing the polymer to obtain "graphene balls" that are substantially hollow. The heat treatment or pyrolyzation procedure typically acts to produce an empty space between the embracing graphene sheets (in the shell) and the lithium-attracting seed material particle and also convert the polymer to carbon. The carbon produced may chemically bond the graphene sheets together, resulting in an encapsulating shell of hybrid graphene/carbon material of structural integrity.

In some embodiments, the step of impregnating the graphene balls with lithium metal comprises a procedure of melt impregnation, solution impregnation, chemical impregnation, or electrochemical impregnation.

The presently invented process leads to the formation of graphene-stabilized lithium metal particles, wherein the particle comprises lithium metal, along with any surviving lithium-attracting material, encapsulated and protected by a shell comprising graphene sheets. These graphene sheets are chemically bonded together by a carbon material to form a shell of structural integrity if polymer is removed through the heating or pyrolyzation treatment. Such a carbon material may not be present if the coating polymer is removed by solvent dissolution.

Thus, the present invention may provide a powder mass of graphene-stabilized lithium metal particles, wherein at least one particle comprises lithium metal, with a lithium-attracting material, which is encapsulated and protected by a shell comprising graphene sheets that are chemically bonded together by a carbon material.

There can be some particles of graphitic material that are not fully utilized (i.e., not all graphene sheets have been peeled off) after step b). Hence, in an embodiment, an amount of residual graphitic material remains after step b) and the method further comprises a step of incorporating the graphene-stabilized lithium metal particles and the residual graphitic material into a battery electrode. The residual graphitic material can serve as a conductive filler in the battery electrode.

In another embodiment, an amount of residual graphitic material remains after step b), and step c) includes a step of partially or completely separating the residual amount of graphitic material from the graphene-embraced particles.

In some embodiments, the polymer-coated solid particles of a lithium-attracting material have a polymer coating thickness from 5 nm to 1 mm (more typically from 10 nm to 500 µm). This polymer coating resides between surfaces of the solid particles of lithium-attracting material and the graphene sheets. The method further contains a step of heat-treating the graphene-embraced polymer-coated particles to convert the polymer to a carbon material and pores, wherein the pores form empty spaces between surfaces of the solid particles and the graphene sheets, and the carbon material may help chemically bond the graphene sheets together.

The energy impacting apparatus may be a vibratory ball mill, planetary ball mill, high energy mill, basket mill, agitator ball mill, cryogenic ball mill, micro ball mill, tumbler ball mill, continuous ball mill, stirred ball mill, pressurized ball mill, plasma-assisted ball mill, freezer mill, vibratory sieve, bead mill, nano bead mill, ultrasonic homogenizer mill, centrifugal planetary mixer, vacuum ball mill, or resonant acoustic mixer. The procedure of operating the energy impacting apparatus may be conducted in a continuous manner using a continuous energy impacting device In the graphene-embraced particles, the graphene sheets contain single-layer graphene sheets. In some embodiments, the graphene sheets contain at least 80% single-layer graphene or at least 80% few-layer graphene having no greater than 10 graphene planes.

The impacting chamber may further contain a functionalizing agent and step (b) of operating the energy impacting apparatus acts to chemically functionalize said graphene sheets with said functionalizing agent. The functionalizing agent may contain a chemical functional group selected from alkyl or aryl silane, alkyl or aralkyl group, hydroxyl group, carboxyl group, amine group, sulfonate group ($-SO_3H$), aldehydic group, quinoidal, fluorocarbon, or a combination thereof.

In some embodiments, the functionalizing agent contains an oxygenated group selected from the group consisting of hydroxyl, peroxide, ether, keto, and aldehyde. In some embodiments, the functionalizing agent contains a functional group selected from the group consisting of $SO_3H$, COOH, $NH_2$, OH, R'CHOH, CHO, CN, COCl, halide, COSH, SH, COOR', SR', $SiR'_3$, Si(—OR'—), $R'_{3-y}$, Si(—O—$SiR'_2$—)OR', R", Li, $AlR'_2$, Hg—X, $TlZ_2$ and Mg—X; wherein y is an integer equal to or less than 3, R' is hydrogen, alkyl, aryl, cycloalkyl, or aralkyl, cycloaryl, or poly(alkylether), R" is fluoroalkyl, fluoroaryl, fluorocycloalkyl, fluoroaralkyl or cycloaryl, X is halide, and Z is carboxylate or trifluoroacetate, and combinations thereof.

In some embodiments, the functionalizing agent contains a functional group is selected from the group consisting of amidoamines, polyamides, aliphatic amines, modified aliphatic amines, cycloaliphatic amines, aromatic amines, anhydrides, ketimines, diethylenetriamine (DETA), triethylene-tetramine (TETA), tetraethylene-pentamine (TEPA), polyethylene polyamine, polyamine epoxy adduct, phenolic hardener, non-brominated curing agent, non-amine curatives, and combinations thereof.

The functionalizing agent may contain a functional group selected from OY, NHY, O=C—OY, P=C—NR'Y, O=C—SY, O=C—Y, —CR' 1-OY, N'Y or C'Y, and Y is a functional group of a protein, a peptide, an amino acid, an enzyme, an antibody, a nucleotide, an oligonucleotide, an antigen, or an enzyme substrate, enzyme inhibitor or the transition state analog of an enzyme substrate or is selected from R'—OH, R'—$NR'_2$, R'SH, R'CHO, R'CN, R'X, $R'N^+$ $(R')_3X^-$, $R'SiR'_3$, R'Si(—OR'—$)_yR'_{3-y}$, R'Si(—O—$SiR'_2$—) OR', R'—R", R'—N—CO, $(C_2H_4O)_w$—), H, (—$C_3H_6O$—), H, (—$C_2H_4O)_w$—R', $(C_3H_6O)$, —R', R', and w is an integer greater than one and less than 200.

The present invention also provides a powder mass of graphene-embraced particles of solid active material produced by the aforementioned method, wherein the graphene proportion is from 0.01% to 20% by weight based on the total weight of graphene and lithium metal combined.

Also provided is a battery electrode containing the graphene-embraced lithium metal particles produced according to the presently invented method, and a battery or lithium-ion capacitor containing such an electrode. The battery electrode containing the graphene-embraced lithium metal particles may be a lithium-ion battery, lithium metal secondary battery, lithium-sulfur battery, lithium-air battery, or lithium-selenium battery.

The lithium-ion or lithium metal battery may comprise an anode, an electrolyte (with an optional separator), and a cathode. The anode may contain the presently invented graphene-stabilized lithium metal particles as the only anode active material. In other embodiments, the anode may contain the presently invented graphene-stabilized lithium metal particles and another anode active material, selected from the group consisting of: (A) lithiated and un-lithiated silicon (Si), germanium (Ge), tin (Sn), lead (Pb), antimony (Sb), bismuth (Bi), zinc (Zn), aluminum (Al), titanium (Ti), nickel (Ni), cobalt (Co), and cadmium (Cd); (B) lithiated and un-lithiated alloys or intermetallic compounds of Si, Ge, Sn, Pb, Sb, Bi, Zn, Al, Ti, Ni, Co, or Cd with other elements; (C) lithiated and un-lithiated oxides, carbides, nitrides, sulfides, phosphides, selenides, and tellurides of Si, Ge, Sn, Pb, Sb, Bi, Zn, Al, Ti, Fe, Ni, Co, or Cd, and their mixtures, composites, or lithium-containing composites; (D) lithiated and un-lithiated salts and hydroxides of Sn; (E) lithium titanate, lithium manganate, lithium aluminate, lithium-containing titanium oxide, lithium transition metal oxide; (F) lithiated or unlithiated carbon of graphite particles; and (G) combinations thereof.

The invented battery may contain a cathode active material selected from an inorganic material, an organic or polymeric material, a metal oxide/phosphate/sulfide, or a combination thereof. The metal oxide/phosphate/sulfide may be selected from a lithium cobalt oxide, lithium nickel oxide, lithium manganese oxide, lithium vanadium oxide, lithium-mixed metal oxide, lithium iron phosphate, lithium manganese phosphate, lithium vanadium phosphate, lithium mixed metal phosphate, sodium cobalt oxide sodium nickel oxide, sodium manganese oxide, sodium vanadium oxide, sodium-mixed metal oxide, sodium iron phosphate, sodium manganese phosphate, sodium vanadium phosphate, sodium mixed metal phosphate, transition metal sulfide, lithium polysulfide, sodium polysulfide, magnesium polysulfide, or a combination thereof.

In some embodiments, the invented battery contains a cathode active material selected from sulfur, sulfur compound, sulfur-carbon composite, sulfur-polymer composite, lithium polysulfide, transition metal dichalcogenide, a transition metal trichalcogenide, or a combination thereof. The inorganic material may be selected from $TiS_2$, $TaS_2$, $MoS_2$, $NbSe_3$, $MnO_2$, $COO_2$, an iron oxide, a vanadium oxide, or a combination thereof.

The metal oxide/phosphate/sulfide contains a vanadium oxide selected from the group consisting of $VO_2$, $Li_xVO_2$, $V_2O_5$, $Li_xV_2O_5$, $V_3O_8$, $Li_xV_3O_8$, $Li_xV_3O_7$, $V_4O_9$, $Li_xV_4O_9$, $V_6O_{13}$, $Li_xV_6O_{13}$, their doped versions, their derivatives, and combinations thereof, wherein $0.1<x<5$. In some embodiments, the metal oxide/phosphate/sulfide is selected from a layered compound $LiMO_2$, spinel compound $LiM_2O_4$, olivine compound $LiMPO_4$, silicate compound $Li_2MSiO_4$, favorite compound $LiMPO_4F$, borate compound $LiMBO_3$, or a combination thereof, wherein M is a transition metal or a mixture of multiple transition metals.

The inorganic material may be selected from: (a) bismuth selenide or bismuth telluride, (b) transition metal dichalcogenide or trichalcogenide, (c) sulfide, selenide, or telluride of niobium, zirconium, molybdenum, hafnium, tantalum, tungsten, titanium, cobalt, manganese, iron, nickel, or a transition metal; (d) boron nitride, or (e) a combination thereof.

The organic material or polymeric material is selected from poly(anthraquinonyl sulfide) (PAQS), a lithium oxocarbon, 3,4,9,10-perylenetetracarboxylic dianhydride (PTCDA), poly(anthraquinonyl sulfide), pyrene-4,5,9,10-tetraone (PYT), polymer-bound PYT, quino(triazene), redox-active organic material, tetracyanoquinodimethane (TCNQ), tetracyanoethylene (TCNE), 2,3,6,7,10,11-hexamethoxytriphenylene (HMTP), poly(5-amino-1,4-dyhydroxy anthraquinone) (PADAQ), phosphazene disulfide polymer ([(NPS$_2$)$_3$]n), lithiated 1,4,5,8-naphthalenetetraol formaldehyde polymer, hexaazatrinaphtylene (HATN), hexaazatriphenylene hexacarbonitrile (HAT(CN)$_6$), 5-benzylidene hydantoin, isatine lithium salt, pyromellitic diimide lithium salt, tetrahydroxy-p-benzoquinone derivatives (THQLi$_4$), N,N'-diphenyl-2,3,5,6-tetraketopiperazine (PHP), N,N'-diallyl-2,3,5,6-tetraketopiperazine (AP), N,N'-dipropyl-2,3,5,6-tetraketopiperazine (PRP), a thioether polymer, a quinone compound, 1,4-benzoquinone, 5,7,12,14-pentacenetetrone (PT), 5-amino-2,3-dihydro-1,4-dyhydroxy anthraquinone (ADDAQ), 5-amino-1,4-dyhydroxy anthraquinone (ADAQ), calixquinone, Li$_4$C$_6$O$_6$, Li$_2$C$_6$O$_6$, Li$_6$C$_6$O$_6$, or a combination thereof. These compounds are preferably mixed with a conducting material to improve their electrical conductivity.

The thioether polymer in the above list may be selected from poly[methanetetryl-tetra(thiomethylene)] (PMTTM), poly(2,4-dithiopentanylene) (PDTP), a polymer containing poly(ethene-1,1,2,2-tetrathiol) (PETT) as a main-chain thioether polymers, a side-chain thioether polymer having a main-chain consisting of conjugating aromatic moieties, and having a thioether side chain as a pendant, poly(2-phenyl-1,3-dithiolane) (PPDT), Poly(1,4-di(1,3-dithiolan-2-yl)benzene) (PDDTB), poly(tetrahydrobenzodithiophene) (PTHBDT), poly[1,2,4,5-tetrakis(propylthio)benzene] (PTKPTB, or poly[3,4(ethylenedithio)thiophene] (PEDTT).

In some embodiments, the organic material contains a phthalocyanine compound selected from copper phthalocyanine, zinc phthalocyanine, tin phthalocyanine, iron phthalocyanine, lead phthalocyanine, nickel phthalocyanine, vanadyl phthalocyanine, fluorochromium phthalocyanine, magnesium phthalocyanine, manganous phthalocyanine, dilithium phthalocyanine, aluminum phthalocyanine chloride, cadmium phthalocyanine, chlorogallium phthalocyanine, cobalt phthalocyanine, silver phthalocyanine, a metal-free phthalocyanine, a chemical derivative thereof, or a combination thereof. These compounds are preferably mixed with a conducting material to improve their electrical conductivity.

In some embodiments, the electrode active material particles (e.g. Si for the anode and LiCoO$_2$ for the cathode) include powder, flakes, beads, pellets, spheres, wires, fibers, filaments, discs, ribbons, or rods, having a diameter or thickness from 10 nm to 20 μm. Preferably, the diameter or thickness is from 1 μm to 100 μm.

The graphene production step per se (peeling off graphene sheets directly from graphite particles and immediately or concurrently transferring these graphene sheets to polymer-coated solid particle surfaces) is less complex, time intensive and costly than many prior methods to create graphene in industrial quantities. In other words, it had been generally believed that chemical intercalation and oxidation is needed to produce bulk quantities of isolated graphene sheets (NGPs). The present invention defies this expectation in many ways:

1. Unlike the chemical intercalation and oxidation (which requires expansion of inter-graphene spaces, further expansion or exfoliation of graphene planes, and full separation of exfoliated graphene sheets), the instant method directly removes graphene sheets from a source graphitic material and transfers these graphene sheets to surfaces of electrode active material particles. No undesirable chemicals (e.g. sulfuric acid and nitric acid) are used.
2. Unlike oxidation and intercalation, pristine graphene sheets can be transferred onto the electrode active material. The sheets being free of oxidation damage allow the creation of graphene-encapsulated particle products with higher electrical and thermal conductivity.
3. Contrary to common production methods, a washing process is not needed
4. Unlike bottom up production methods capable of producing small graphene sheets, large graphene sheets can be produced with the instant method.
5. Unlike CVD and solution-based metalorganic production methods, elevated temperatures are not required to reduce graphene oxide to graphene and metalorganic compounds to pure metal. This greatly reduces the opportunity for undesirable diffusion of carbon into the electrode active material.
6. Unlike CVD and solution-based metalorganic production methods, this process is amenable to almost any electrode active material. The electrode active material does not need to be a compatible "template" or catalyst, as is required for the CVD process.
7. This direct transfer process does not require the use of externally added ball milling media (such as zirconia beads or plastic beads). The polymer-coated solid particles themselves may be the graphene-peeling media. The presence of extra milling media may lead to a thicker graphene shell, if so desired.
8. The present invention is amenable to industrial scale production in a continuous energy impact device.

DETAILED DESCRIPTION OF PREFERRED EMBODIMENTS

Carbon materials can assume an essentially amorphous structure (glassy carbon), a highly organized crystal (graphite), or a whole range of intermediate structures that are characterized in that various proportions and sizes of graphite crystallites and defects are dispersed in an amorphous matrix. Typically, a graphite crystallite is composed of a number of graphene sheets or basal planes that are bonded together through van der Waals forces in the c-axis direction, the direction perpendicular to the basal plane. These graphite crystallites are typically micron- or nanometer-sized. The graphite crystallites are dispersed in or connected by crystal defects or an amorphous phase in a graphite particle, which can be a graphite flake, carbon/graphite fiber segment, carbon/graphite whisker, or carbon/graphite nanofiber. In other words, graphene planes (hexagonal lattice structure of carbon atoms) constitute a significant portion of a graphite particle.

One preferred specific embodiment of the present invention is a method of peeling off graphene planes of carbon atoms (1-10 planes of atoms that are single-layer or few-layer graphene sheets) that are directly transferred to surfaces of electrode active material particles. A graphene sheet or nanographene platelet (NGP) is essentially composed of a sheet of graphene plane or multiple sheets of graphene plane stacked and bonded together (typically, on an average, less than 10 sheets per multi-layer platelet). Each graphene plane, also referred to as a graphene sheet or a hexagonal basal plane, comprises a two-dimensional hexagonal structure of carbon atoms. Each platelet has a length and a width parallel to the graphite plane and a thickness orthogonal to the graphite plane. By definition, the thickness of an NGP is 100 nanometers (nm) or smaller, with a single-sheet NGP being as thin as 0.34 nm. However, the NGPs produced with the instant methods are mostly single-layer graphene and some few-layer graphene sheets (<10 layers and mostly <5 layers). The length and width of a NGP are typically between 200 nm and 20 μm, but could be longer or shorter, depending upon the sizes of source graphite material particles.

The present invention provides a strikingly simple, fast, scalable, environmentally benign, and cost-effective process that avoids essentially all of the drawbacks associated with prior art processes of producing graphene sheets and obviates the need to execute a separate (additional) process to combine the produced graphene sheets and lithium metal particles together to form graphene-stabilized lithium metal particles.

Figure 2:
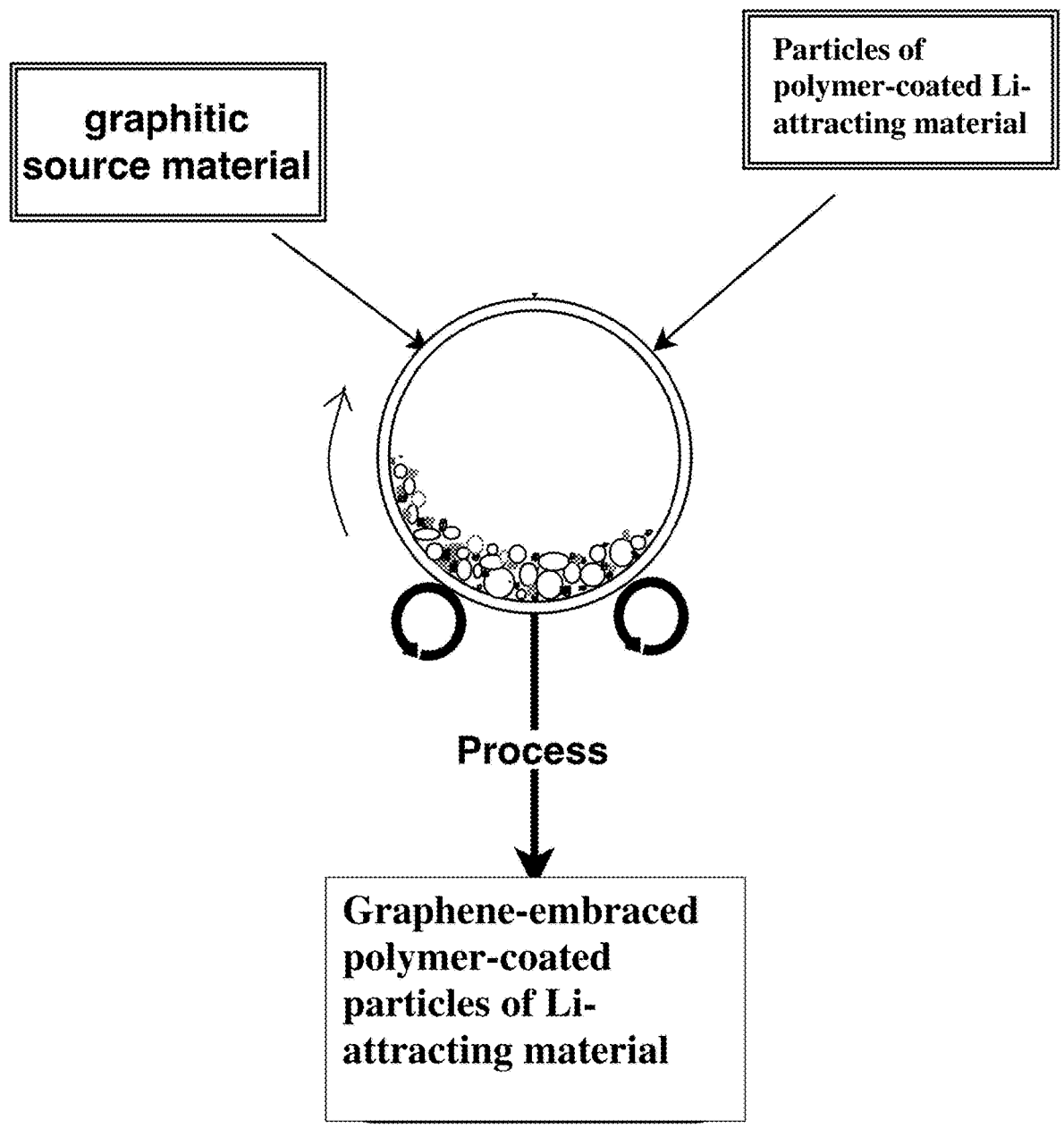
FIG. 2 A diagram showing an embodiment of the presently invented process for producing graphene-stabilized lithium metal particles via an energy impacting apparatus.

As schematically illustrated in FIG. 2, one preferred embodiment of this method entails placing particles of a source graphitic material and polymer-coated particles of a lithium-attracting material (with or without any externally added impacting balls, such as ball-milling media) in an impacting chamber. After loading, the resulting mixture is exposed to impacting energy, which is accomplished, for instance, by rotating the chamber to enable the impacting of the polymer-coated particles against graphite particles. These repeated impacting events (occurring in high frequencies and high intensity) act to peel off graphene sheets from the surfaces of graphitic material particles and, immediately and directly, transfer these graphene sheets to the surfaces of the polymer-coated particles to form graphene-embraced polymer-coated particles. Typically, the entire particle is covered by graphene sheets (fully wrapped around, embraced or encapsulated). This is herein referred to as the "direct transfer" process.

Coating of a polymer layer around solid particles may be accomplished by using a broad array of methods that are well known in the art; e.g. extrusion and pelletizing, spray drying, vibration rod encapsulation, micro-emulsion encapsulation, interfacial polymerization, simple solution coating, etc.

In some embodiments, the lithium-attracting seed material is selected from a metal, a metalloid, carbon, graphite, metal oxide, or a combination thereof. The metal oxide may be selected from $SiO_x$ (0.1<x<1.9), GeO, $SnO_2$, or a transition metal oxide. In some preferred embodiments, the lithium-attracting seed material contains a metal selected from Au, Ag, Mg, Zn, Ti, Na, K, Al, Fe, Mn, Co, Ni, V, Cr, an alloy thereof, or a combination thereof. The lithium-attracting seed material may also contain a metalloid selected from Si, Ge, Sn, Pb, B, Al, Ga, In, Sb, Bi, or a combination thereof.

Alternatively, impacting balls (e.g. stainless steel or zirconia beads) may be added into the impacting chambers and, as such, graphene sheets may also be peeled off by the impacting balls and tentatively transferred to the surfaces of these impacting balls first. When the graphene-coated impacting balls subsequently impinge upon the polymer-coated particles, the graphene sheets are transferred to surfaces of the polymer-coated particles to form graphene-embraced polymer-coated particles. This is an "indirect transfer" process. A potential drawback of such an indirect transfer process is the need to separate the externally added impacting balls (e.g. ball-milling media) from the graphene-embraced polymer-coated particles.

In less than two hours (often less than 1 hour) of operating the direct transfer process, most of the constituent graphene sheets of source graphite particles are peeled off, forming mostly single-layer graphene and few-layer graphene (mostly less than 5 layers or 5 graphene planes). Following the direct transfer process (graphene sheets wrapped around polymer-coated particles), the residual graphite particles (if present) are separated from the graphene-embraced (graphene-encapsulated) particles using a broad array of methods. Separation or classification of graphene-embraced (graphene-encapsulated) particles from residual graphite particles (if any) can be readily accomplished based on their differences in weight or density, particle sizes, magnetic properties, etc.

In other words, production of graphene sheets and mixing of graphene sheets with a lithium metal seed are essentially accomplished concurrently in one operation. The polymer coating is removed and the resulting empty space is filled with lithium metal. This is in stark contrast to the traditional processes of producing graphene sheets first and then subsequently mixing the graphene sheets with lithium metal. Traditional mixing methods typically do not result in encapsulation of lithium metal particles with graphene-based shells.

Figure 1:
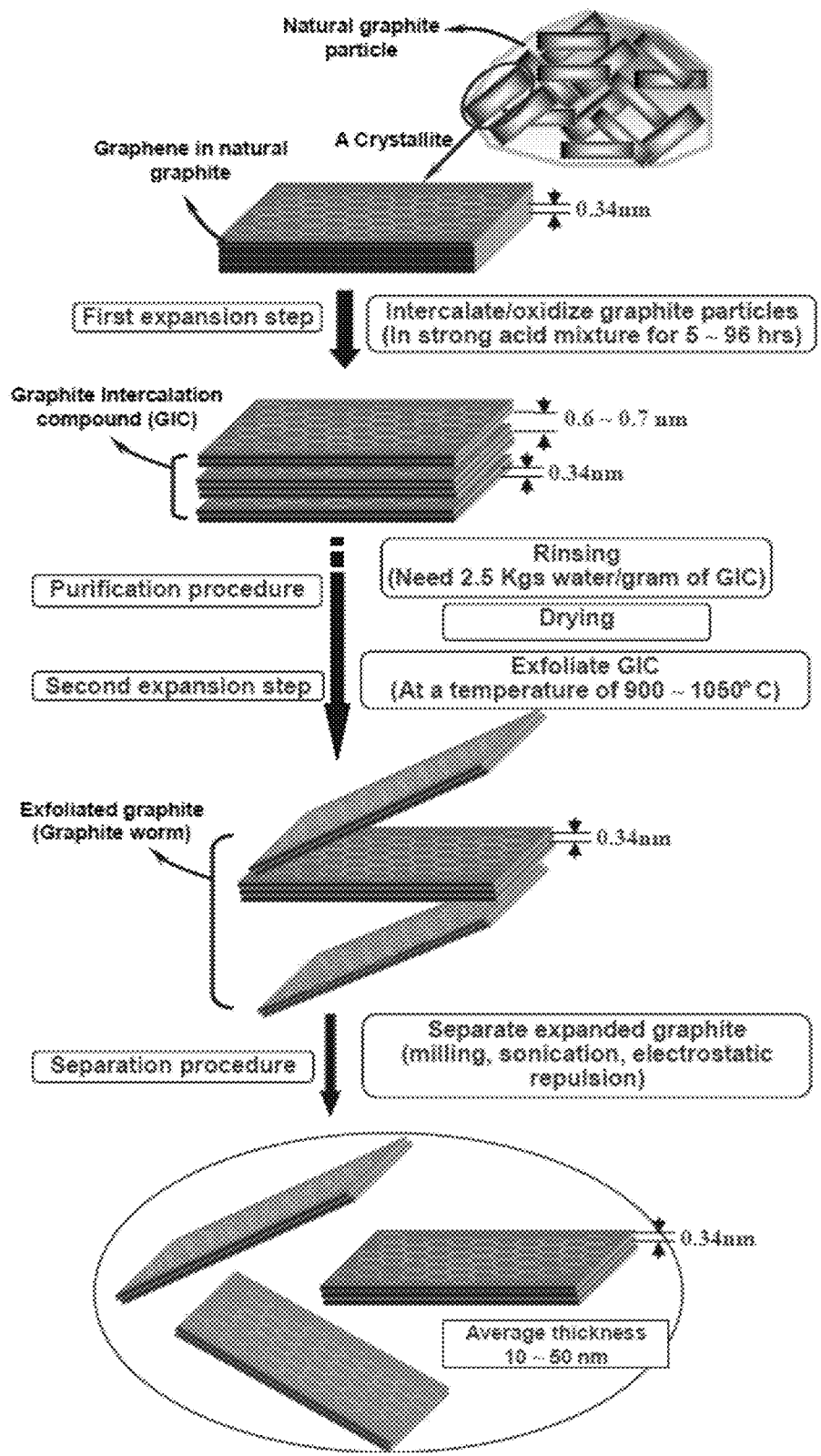
FIG. 1 A flow chart showing the most commonly used prior art process of producing highly oxidized graphene sheets (or nanographene platelets, NGPs) that entails tedious chemical oxidation/intercalation, rinsing, and high-temperature exfoliation procedures.

As shown in FIG. 1, the prior art chemical processes for producing graphene sheets or platelets alone typically involve immersing graphite powder in a mixture of concentrated sulfuric acid, nitric acid, and an oxidizer, such as potassium permanganate or sodium perchlorate, forming a reacting mass that requires typically 5-120 hours to complete the chemical intercalation/oxidation reaction.

The presently invented impacting process entails combining graphene production, functionalization (if desired), and mixing of graphene with electrode active material particles (a seed for lithium metal) in a single operation. This fast and environmentally benign process not only avoids significant chemical usage, but also produces embracing graphene sheets of higher quality—pristine graphene as opposed to thermally reduced graphene oxide produced by the prior art process. Pristine graphene enables the creation of embraced particles with higher electrical and thermal conductivity.

Although the mechanisms remain incompletely understood, this revolutionary process of the present invention has essentially eliminated the conventionally required functions of graphene plane expansion, intercalant penetration, exfoliation, and separation of graphene sheets and replace it with a single, entirely mechanical exfoliation process. The whole process can take less than 2 hours (typically 10 minutes to 1 hour), and can be done with no added chemicals. This is absolutely stunning, a shocking surprise to even those top scientists and engineers or those of extraordinary ability in the art.

Another surprising result of the present study is the observation that a wide variety of carbonaceous and graphitic materials can be directly processed without any particle size reduction or pre-treatment. The particle size of graphite can be smaller than, comparable to, or larger than the particle size of the electrode active material. The graphitic material may be selected from natural graphite, synthetic graphite, highly oriented pyrolytic graphite, mesocarbon microbead, graphite fiber, graphitic nanofiber, graphite oxide, graphite fluoride, chemically modified graphite, exfoliated graphite, or a combination thereof. It may be noted that the graphitic material used for the prior art chemical production and reduction of graphene oxide requires size reduction to 75 um or less in average particle size. This process requires size reduction equipment (for example hammer mills or screening mills), energy input, and dust mitigation. By contrast, the energy impacting device method can accept almost any size of graphitic material. A starting graphitic material of several mm or cm in size or larger or a starting material as small as nanoscaled has been successfully processed to create graphene-coated or graphene-embedded particles of cathode or anode active materials. The only size limitation is the chamber capacity of the energy impacting device; but this chamber can be very large (industry-scaled).

The presently invented process is capable of producing single-layer graphene sheets that completely wrap around the particles of an electrode active material. In many examples, the graphene sheets produced contain at least 80% single-layer graphene sheets. The graphene produced can contain pristine graphene, oxidized graphene with less than 5% oxygen content by weight, graphene fluoride, graphene oxide with less than 5% fluorine by weight, graphene with a carbon content of no less than 95% by weight, or functionalized graphene.

The presently invented process does not involve the production of GIC and, hence, does not require the exfoliation of GIC at a high exfoliation temperature (e.g. 800-1,100° C.). This is another major advantage from environmental protection perspective. The prior art processes require the preparation of dried GICs containing sulfuric acid and nitric acid intentionally implemented in the intergraphene spaces and, hence, necessarily involve the decomposition of $H_2SO_4$ and $HNO_3$ to produce volatile gases (e.g. $NO_x$ and $SO_x$) that are highly regulated environmental hazards. The presently invented process completely obviates the need to decompose $H_2SO_4$ and $HNO_3$ and, hence, is environmentally benign. No undesirable gases are released into the atmosphere during the combined graphite expansion/exfoliation/separation process of the present invention.

Figure 3:
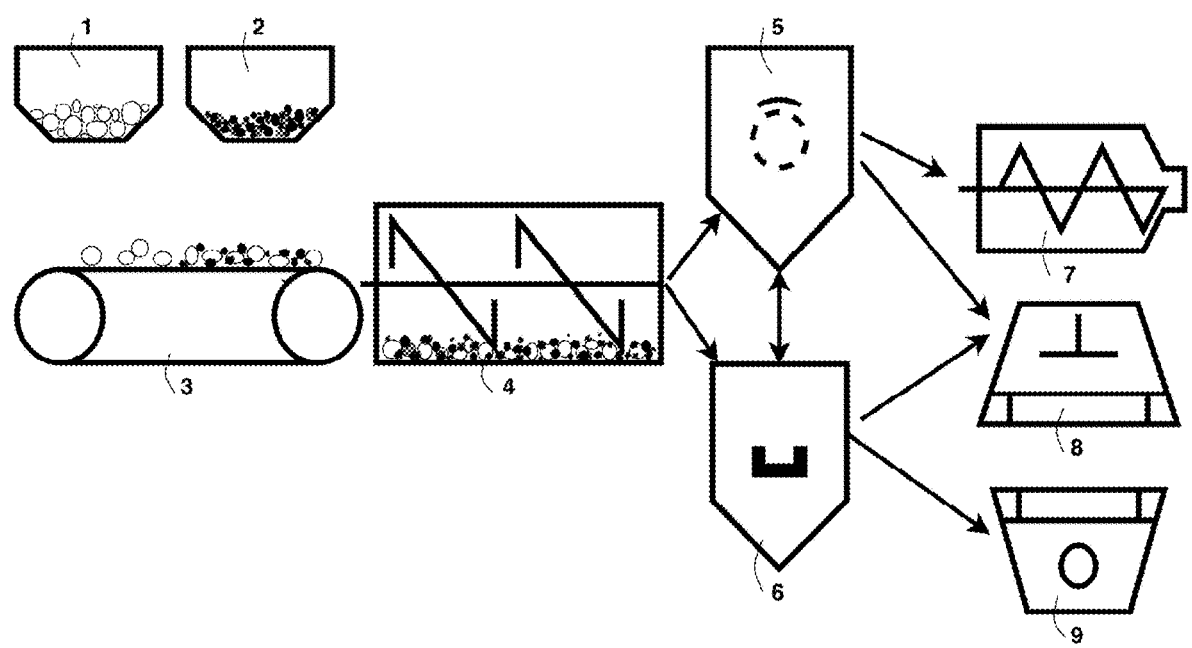
FIG. 3 A diagram showing the presently invented process for producing graphene-stabilized lithium metal particles via a continuous ball mill.

In a desired embodiment, the presently invented method is carried out in an automated and/or continuous manner. For instance, as illustrated in FIG. 3, the mixture of graphite particles 1 and polymer-coated seed material particles 2 is delivered by a conveyer belt 3 and fed into a continuous ball mill 4. After ball milling to form graphene-embraced particles, the product mixture (possibly also containing some residual graphite particles) is discharged from the ball mill apparatus 4 into a screening device (e.g. a rotary drum 5) to separate graphene-embraced particles from residual graphite particles (if any). This separation operation may be assisted by a magnetic separator 6 if the seed material is ferromagnetic (e.g. containing Fe, Co, Ni, or Mn-based metal). The graphene-embraced polymer-coated particles may be delivered into a powder classifier, a cyclone, and or an electrostatic separator. The particles may be further processed, if so desired, by melting 7, pressing 8, or grinding/pelletizing apparatus 9. These procedures can be fully automated. The process may include characterization or classification of the output material and recycling of insufficiently processed material into the continuous energy impacting device. The process may include weight monitoring of the load in the continuous energy impacting device to optimize material properties and throughput.

The energy impacting apparatus may be a vibratory ball mill, planetary ball mill, high energy mill, basket mill, agitator ball mill, cryogenic ball mill, micro ball mill, tumbler ball mill, continuous ball mill, stirred ball mill, pressurized ball mill, plasma-assisted ball mill, freezer mill, vibratory sieve, bead mill, nano bead mill, ultrasonic homogenizer mill, centrifugal planetary mixer, vacuum ball mill, or resonant acoustic mixer. The procedure of operating the energy impacting apparatus may be conducted in a continuous manner using a continuous energy impacting device In some embodiments, the step of removing the polymer coating from the underlying lithium-attracting seed material particles comprises a procedure selected from melting the polymer, dissolving the polymer with a solvent, or heat-treating/pyrolyzing the polymer to obtain "graphene balls" that are substantially hollow. The heat treatment or pyrolyzation procedure typically acts to produce an empty space between the embracing graphene sheets (in the shell) and the lithium-attracting seed material particle and also convert the polymer to carbon. The carbon produced may chemically bond the graphene sheets together.

Thus, in some embodiments, the step of removing the polymer from the particles comprises a procedure of heat-treating or pyrolyzing the polymer at a temperature from 300° C. to 1,500° C. to convert the polymer into a carbon material that chemically bonds the graphene sheets together. Bonding of graphene sheets by such a carbon material results in an encapsulating shell of good structural integrity.

In some embodiments, the step of impregnating the graphene balls with lithium metal comprises a procedure of melt impregnation, solution impregnation, chemical impregnation, or electrochemical impregnation. The presence of a lithium-attracting seed material promotes impregnation or infiltration of lithium metal into the empty space in the graphene ball.

The presently invented process leads to the formation of graphene-stabilized lithium metal particles, wherein the particle comprises lithium metal, along with any surviving lithium-attracting material, encapsulated and protected by a shell comprising graphene sheets. These graphene sheets are chemically bonded together by a carbon material to form a shell of structural integrity if polymer is removed through the heating or pyrolyzation treatment. Such a carbon material may not be present if the coating polymer is removed by solvent dissolution.

The presently invented graphene-stabilized lithium metal particles may be implemented for the following applications:

a) As an anode active material for any battery that requires lithium metal as the anode active material; e.g. lithium metal secondary battery, lithium-sulfur battery, lithium-selenium battery, and lithium-air battery.

b) As a supplementary anode active material for a lithium-ion battery. Such a lithium-ion battery can have a primary anode active material (such as particles of soft carbon, hard carbon, graphite, Si, Ge, Sn, $SiO_x$, and $SnO_2$), which is mixed with the invented graphene-stabilized lithium metal particles (e.g. serving as a lithium source for pre-lithiating these primary anode particles). The cathode can contain any conventional cathode active material that is lithiated (e.g. $LiCoO_2$, NMC, NCA, lithium iron phosphate, etc.) or non-lithiated (e.g. $TiS_2$, $MoSe_2$, S, Se, organic or polymer cathode materials, etc.).

c) As a primary or supplementary anode active material for a lithium-ion capacitor or hybrid battery.

The primary anode active material that can be used in conjunction with the presently invented graphene-stabilized lithium metal particles may be selected from the group consisting of: (A) lithiated and un-lithiated silicon (Si), germanium (Ge), tin (Sn), lead (Pb), antimony (Sb), bismuth (Bi), zinc (Zn), aluminum (Al), titanium (Ti), nickel (Ni), cobalt (Co), and cadmium (Cd); (B) lithiated and un-lithiated alloys or intermetallic compounds of Si, Ge, Sn, Pb, Sb, Bi, Zn, Al, Ti, Ni, Co, or Cd with other elements; (C) lithiated and un-lithiated oxides, carbides, nitrides, sulfides, phosphides, selenides, and tellurides of Si, Ge, Sn, Pb, Sb, Bi, Zn, Al, Ti, Fe, Ni, Co, or Cd, and their mixtures, composites, or lithium-containing composites; (D) lithiated and un-lithiated salts and hydroxides of Sn; (E) lithium titanate, lithium manganate, lithium aluminate, lithium-containing titanium oxide, lithium transition metal oxide; (F) carbon or graphite particles; and (G) combinations thereof.

The cathode active material for use in the presently invented battery may be selected from an inorganic material, an organic material, an intrinsically conducting polymer (known to be capable of string lithium ions), a metal oxide/phosphate/sulfide, or a combination thereof. The metal oxide/phosphate/sulfide may be selected from a lithium cobalt oxide, lithium nickel oxide, lithium manganese oxide, lithium vanadium oxide, lithium-mixed metal oxide, lithium iron phosphate, lithium manganese phosphate, lithium vanadium phosphate, lithium mixed metal phosphate, transition metal sulfide, lithium polysulfide, or a combination thereof.

In some embodiments, the cathode active material may be selected from sulfur, sulfur compound, sulfur-carbon composite, sulfur-polymer composite, lithium polysulfide, transition metal dichalcogenide, a transition metal trichalcogenide, or a combination thereof. The inorganic material may be selected from $TiS_2$, $TaS_2$, $MoS_2$, $NbSe_3$, $MnO_2$, $COO_2$, an iron oxide, a vanadium oxide, or a combination thereof. This group of materials is particularly suitable for use as a cathode active material of a lithium metal battery.

The metal oxide/phosphate/sulfide contains a vanadium oxide selected from the group consisting of $VO_2$, $Li_xVO_2$, $V_2O_5$, $Li_xV_2O_5$, $V_3O_8$, $Li_xV_3O_8$, $Li_xV_3O_7$, $V_4O_9$, $Li_xV_4O_9$, $V_6O_{13}$, $Li_xV_6O_{13}$, their doped versions, their derivatives, and combinations thereof, wherein $0.1<x<5$. In some embodiments, the metal oxide/phosphate/sulfide is selected from a layered compound $LiMO_2$, spinel compound $LiM_2O_4$, olivine compound $LiMPO_4$, silicate compound $Li_2MSiO_4$, Tavorite compound $LiMPO_4F$, borate compound $LiMBO_3$, or a combination thereof, wherein M is a transition metal or a mixture of multiple transition metals.

The inorganic material may be selected from: (a) bismuth selenide or bismuth telluride, (b) transition metal dichalcogenide or trichalcogenide, (c) sulfide, selenide, or telluride of niobium, zirconium, molybdenum, hafnium, tantalum, tungsten, titanium, cobalt, manganese, iron, nickel, or a transition metal; (d) boron nitride, or (e) a combination thereof.

The organic material or polymeric material may be selected from poly(anthraquinonyl sulfide) (PAQS), a lithium oxocarbon, 3,4,9,10-perylenetetracarboxylic dianhydride (PTCDA), poly(anthraquinonyl sulfide), pyrene-4, 5,9,10-tetraone (PYT), polymer-bound PYT, quino(triazene), redox-active organic material, tetracyanoquinodimethane (TCNQ), tetracyanoethylene (TCNE), 2,3,6,7,10,11-hexamethoxytriphenylene (HMTP), poly(5-amino-1,4-dyhydroxy anthraquinone) (PADAQ), phosphazene disulfide polymer ($[(NPS_2)_3]n$), lithiated 1,4, 5,8-naphthalenetetraol formaldehyde polymer, hexaazatrinaphtylene (HATN), hexaazatriphenylene hexacarbonitrile ($HAT(CN)_6$), 5-benzylidene hydantoin, isatine lithium salt, pyromellitic diimide lithium salt, tetrahydroxy-p-benzoquinone derivatives ($THQLi_4$), N,N'-diphenyl-2,3,5,6-tetraketopiperazine (PHP), N,N'-diallyl-2,3,5,6-tetraketopiperazine (AP), N,N'-dipropyl-2,3,5,6-tetraketopiperazine (PRP), a thioether polymer, a quinone compound, 1,4-benzoquinone, 5,7,12,14-pentacenetetrone (PT), 5-amino-2,3-dihydro-1,4-dyhydroxy anthraquinone (ADDAQ), 5-amino-1,4-dyhydroxy anthraquinone (ADAQ), calixquinone, $Li_4C_6O_6$, $Li_2C_6O_6$, $Li_6C_6O_6$, or a combination thereof. These compounds are preferably mixed with a conducting material to improve their electrical conductivity, rigidity and strength so as to enable the peeling-off of graphene sheets from the graphitic material particles.

The thioether polymer in the above list may be selected from poly[methanetetryl-tetra(thiomethylene)] (PMTTM), poly(2,4-dithiopentanylene) (PDTP), a polymer containing poly(ethene-1,1,2,2-tetrathiol) (PETT) as a main-chain thioether polymers, a side-chain thioether polymer having a main-chain consisting of conjugating aromatic moieties, and having a thioether side chain as a pendant, poly(2-phenyl-1,3-dithiolane) (PPDT), poly(1,4-di(1,3-dithiolan-2-yl)benzene) (PDDTB), poly(tetrahydrobenzodithiophene) (PTHBDT), poly[1,2,4,5-tetrakis(propylthio)benzene] (PTKPTB, or poly[3,4(ethylenedithio)thiophene] (PEDTT).

In some embodiments, the organic material contains a phthalocyanine compound selected from copper phthalocyanine, zinc phthalocyanine, tin phthalocyanine, iron phthalocyanine, lead phthalocyanine, nickel phthalocyanine, vanadyl phthalocyanine, fluorochromium phthalocyanine, magnesium phthalocyanine, manganous phthalocyanine, dilithium phthalocyanine, aluminum phthalocyanine chloride, cadmium phthalocyanine, chlorogallium phthalocyanine, cobalt phthalocyanine, silver phthalocyanine, a metal-free phthalocyanine, a chemical derivative thereof, or a combination thereof. These compounds are preferably mixed with a conducting material to improve their electrical conductivity and rigidity so as to enable the peeling-off of graphene sheets from the graphitic material particles.

In some embodiments, the electrode active material particles include powder, flakes, beads, pellets, spheres, wires, fibers, filaments, discs, ribbons, or rods, having a diameter or thickness from 10 nm to 20 µm. Preferably, the diameter or thickness is from 1 µm to 100 µm.

In the invented method, the graphitic material may be selected from natural graphite, synthetic graphite, highly oriented pyrolytic graphite, graphite fiber, graphitic nanofiber, graphite fluoride, chemically modified graphite, mesocarbon microbead, partially crystalline graphite, or a combination thereof.

Graphene sheets transferred to electrode active material surfaces have a significant proportion of surfaces that correspond to the edge planes of graphite crystals. The carbon atoms at the edge planes are reactive and must contain some heteroatom or group to satisfy carbon valency. There are many types of functional groups (e.g. hydroxyl and carboxylic) that are naturally present at the edge or surface of graphene nanoplatelets produced through transfer to a solid carrier particle. The impact-induced kinetic energy is of sufficient energy and intensity to chemically activate the edges and even surfaces of graphene sheets embraced around active material particles (e.g. creating highly active sites or free radicals). Provided that certain chemical species containing desired chemical function groups (e.g. OH—, —COOH, —$NH_2$, Br—, etc.) are included in the impacting chamber, these functional groups can be imparted to graphene edges and/or surfaces. In other words, production and chemical functionalization of graphene sheets can be accomplished concurrently by including appropriate chemical compounds in the impacting chamber. In summary, a major advantage of the present invention over other processes is the simplicity of simultaneous production and modification of graphene surface chemistry for improved battery performance.

Graphene platelets derived by this process may be functionalized through the inclusion of various chemical species in the impacting chamber. In each group of chemical species discussed below, we selected 2 or 3 chemical species for functionalization studies.

In one preferred group of chemical agents, the resulting functionalized NGP may broadly have the following formula (e): [NGP]-$R_m$, wherein m is the number of different functional group types (typically between 1 and 5), R is selected from $SO_3H$, COOH, $NH_2$, OH, R'CHOH, CHO, CN, COCl, halide, COSH, SH, COOR', SR', $SiR'_3$, Si(—OR'—), $R'_3$-y, Si(—O—$SiR'_2$—)OR', R", Li, $AlR'_2$, Hg—X, $TlZ_2$ and Mg—X; wherein y is an integer equal to or less than 3, R' is hydrogen, alkyl, aryl, cycloalkyl, or aralkyl, cycloaryl, or poly(alkylether), R" is fluoroalkyl, fluoroaryl, fluorocycloalkyl, fluoroaralkyl or cycloaryl, X is halide, and Z is carboxylate or trifluoroacetate.

Graphene-embraced electrode active material particles may be used to improve the mechanical properties, electrical conductivity and thermal conductivity of an electrode. For enhanced lithium-capturing and storing capability, the functional group —$NH_2$ and —OH are of particular interest. For example, diethylenetriamine (DETA) has three —$NH_2$ groups. If DETA is included in the impacting chamber, one of the three —$NH_2$ groups may be bonded to the edge or surface of a graphene sheet and the remaining two unreacted —$NH_2$ groups will be available for reversibly capturing a lithium or sodium atom and forming a redox pair therewith. Such an arrangement provides an additional mechanism for storing lithium or sodium ions in a battery electrode.

Other useful chemical functional groups or reactive molecules may be selected from the group consisting of amidoamines, polyamides, aliphatic amines, modified aliphatic amines, cycloaliphatic amines, aromatic amines, anhydrides, ketimines, diethylenetriamine (DETA), triethylene-tetramine (TETA), tetraethylene-pentamine (TEPA), hexamethylenetetramine, polyethylene polyamine, polyamine epoxy adduct, phenolic hardener, non-brominated curing agent, non-amine curatives, and combinations thereof. These functional groups are multi-functional, with the capability of reacting with at least two chemical species from at least two ends. Most importantly, they are capable of bonding to the edge or surface of graphene using one of their ends and, during subsequent epoxy curing stage, are able to react with epoxide or epoxy resin material at one or two other ends.

The above-described [NGP]-$R_m$ may be further functionalized. This can be conducted by opening up the lid of an impacting chamber after the —$R_m$ groups have been attached to graphene sheets and then adding the new functionalizing agents to the impacting chamber and resuming the impacting operation. The resulting graphene sheets or platelets include compositions of the formula: [NGP]-$A_m$, where A is selected from OY, NHY, O=C—OY, P=C—NR'Y, O=C—SY, O=C—Y, —CR'1-OY, N'Y or C'Y, and Y is an appropriate functional group of a protein, a peptide, an amino acid, an enzyme, an antibody, a nucleotide, an oligonucleotide, an antigen, or an enzyme substrate, enzyme inhibitor or the transition state analog of an enzyme substrate or is selected from R'—OH, R'—$NR'_2$, R'SH, R'CHO, R'CN, R'X, R'N+$(R')_3$X, $R'SiR'_3$, R'Si(—OR'—)$_y$$R'_{3-y}$, R'Si(—O—SiR'2-)OR', R'—R", R'—N—CO, $(C_2H_4O$—$)_w$H, (—$C_3H_6O$—$)_w$H, (—$C_2H_4O)_w$—R', $(C_3H_6O)_w$—R', R', and w is an integer greater than one and less than 200.

The NGPs may also be functionalized to produce compositions having the formula: [NGP]-[R'-A]$_m$, where m, R' and A are as defined above. The compositions of the invention also include NGPs upon which certain cyclic compounds are adsorbed. These include compositions of matter of the formula: [NGP]-[X—R]$_m$, where a is zero or a number less than 10, X is a polynuclear aromatic, polyheteronuclear aromatic or metallopolyheteronuclear aromatic moiety and R is as defined above. Preferred cyclic compounds are planar. More preferred cyclic compounds for adsorption are porphyrins and phthalocyanines. The adsorbed cyclic compounds may be functionalized. Such compositions include compounds of the formula, [NGP]-[X-$A_a$]$_m$, where m, a, X and A are as defined above.

The functionalized NGPs of the instant invention can be prepared by sulfonation, electrophilic addition to deoxygenated platelet surfaces, or metallation. The graphitic platelets can be processed prior to being contacted with a functionalizing agent. Such processing may include dispersing the platelets in a solvent. In some instances the platelets may then be filtered and dried prior to contact. One particularly useful type of functional group is the carboxylic acid moieties, which naturally exist on the surfaces of NGPs if they are prepared from the acid intercalation route discussed earlier. If carboxylic acid functionalization is needed, the NGPs may be subjected to chlorate, nitric acid, or ammonium persulfate oxidation.

Carboxylic acid functionalized graphitic platelets are particularly useful because they can serve as the starting point for preparing other types of functionalized NGPs. For example, alcohols or amides can be easily linked to the acid to give stable esters or amides. If the alcohol or amine is part of a di- or poly-functional molecule, then linkage through the O- or NH-leaves the other functionalities as pendant groups. These reactions can be carried out using any of the methods developed for esterifying or aminating carboxylic acids with alcohols or amines as known in the art. Examples of these methods can be found in G. W. Anderson, et al., J. Amer. Chem. Soc. 86, 1839 (1964), which is hereby incorporated by reference in its entirety. Amino groups can be introduced directly onto graphitic platelets by treating the platelets with nitric acid and sulfuric acid to obtain nitrated platelets, then chemically reducing the nitrated form with a reducing agent, such as sodium dithionite, to obtain amino-functionalized platelets. Functionalization of the graphene-coated inorganic particles may be used as a method to introduce dopants into the electrode active material.

The following examples serve to provide the best modes of practice for the present invention and should not be construed as limiting the scope of the invention:

Example 1: Graphene-Stabilized Lithium Metal Particles

Several types of lithium-attracting materials (Ag, Zn, Ti, $SnO_2$, $Co_3O_4$, and Si as illustrative examples) in a fine powder form were investigated. These active materials either were prepared in house or were commercially available. The particles were then coated with a polymer (ABS plastic, silicone rubber, and phenolic resin, respectively) using extrusion and solution encapsulation. The volume fraction of the polymer in the resulting polymer-coated solid particles was varied from 0.1 to 0.95.

In an experiment, 10 g of a lithium-attracting material powder and 10-100 mg of natural flake graphite, 50 mesh (average particle size 0.18 mm; Asbury Carbons, Asbury N.J.) were placed in a high-energy ball mill container. The ball mill was operated at 300 rpm for 0.5 to 4 hours. The container lid was then removed and particles of the active materials were found to be fully coated (embraced or encapsulated) with a dark layer, which was verified to be graphene by Raman spectroscopy. The mass of processed material was placed over a 50 mesh sieve and, in some cases, a small amount of unprocessed flake graphite was removed.

The polymer coating was burned off (in the cases of phenolic resin or rubber) or dissolved in a solvent (e.g. ABS or polystyrene in toluene) to generate an empty space between the graphene-based encapsulating shell and the lithium metal-attracting material particle. The resulting hollow graphene balls were impregnated with lithium metal using the procedure of melt infiltration at approximately 200° C.

Example 2: Functionalized Graphene-Encapsulated Lithium Metal Particles

The process of example 1 was replicated with the inclusion of 0.5 grams of urea as a nitrogen source and ABS-coated Sn particles as the lithium metal-attracting material. The coated powder created was functionalized graphene-encapsulated polymer-coated Sn particles. The coating polymer was then removed by immersing the graphene-encapsulated polymer-coated Sn particles in an organic solvent. It may be noted that chemical functionalization was used to improve wettability of graphene sheets by lithium metal melt.

Example 3: Graphene-Embraced Lithium Metal Particles Containing $SnO_2$ Seed Particle In an experiment, 2 grams of tin oxide powder (3.5 µm in diameter), coated with a layer of polyethylene terephthalate (PET, 1-12 µm thick), and 0.25 grams of artificial graphite flakes were placed in a resonant acoustic mill and processed for 5 minutes. For comparison, the same experiment was conducted, but the milling container further contains zirconia milling beads. We were surprised to discover that the former process (PET-coated tin oxide particles serving as the milling media per se without the externally added zirconia milling beads) led to mostly single-particle particulate (each particulate contains one particle encapsulated by graphene sheets). In contrast, with the presence of externally added milling beads, a graphene-embraced particulate tends to contain multiple PET-coated tin oxide particles (typically 3-10) wrapped around by graphene sheets. These same results were also observed for most of metal oxide-based lithium-attracting materials. We have further observed that embraced single-particle particulates tend to lead to a higher specific capacity (especially under high-rate conditions) and longer cycle life.

Example 4: Graphene-Encapsulated Si Micron Particles and Lithium Metal Particles In a first experiment, 500 g of Si powder (particle diameter ~3 µm) and 50 grams of mesocarbon microbeads (MCMB) were placed in a high-intensity ball mill. The mill was operated for 20 minutes, after which the container lid was opened and un-processed MCMB was removed by a 50 mesh sieve. The Si powder was coated with a dark layer, which was verified to be graphene by Raman spectroscopy. This graphene-coated Si powder was later incorporated as the primary anode active material in several lithium-ion batteries.

In a second experiment, micron-scaled Si particles from the same batch were pre-coated with a layer of polyethylene (PE) using a micro-encapsulation method that includes preparing solution of PE dissolved in toluene, dispersing Si particles in this solution to form a slurry, and spry-drying the slurry to form PE-encapsulated Si particles. Then, 500 g of PE-encapsulated Si particles and 50 grams of MCMB were placed in a high-intensity ball mill. The mill was operated for 20 minutes, after which the container lid was opened and un-processed MCMB was removed by a 50 mesh sieve. The PE-encapsulated Si particles (PE layer varied from 0.3 to 2.0 m) were now also embraced with graphene sheets. These graphene-embraced PE-encapsulated particles were then subjected to a heat treatment (up to 600° C.) that converted PE to carbon. The converted carbon was mostly deposited on the exterior surface of the Si particles and bonded to graphene sheets, leaving behind a gap or pores between the Si particle surface and the encapsulating graphene shell. This gap provides room to accommodate lithium metal.

Example 5: Graphene-Embraced Rubber-Coated Ge Particles (Using Mesocarbon Microbeads or MCMBs as the Graphene Source)

In one example, 500 grams of SBR rubber-coated B-doped Ge powder (a lithium-attracting material) and 10 grams of MCMBs (China Steel Chemical Co., Taiwan) were placed in a ball mill, and processed for 3 hours. In separate experiments, un-processed MCMB was removed by sieving, air classification, and settling in a solvent solution. The graphene loading of the coated particles was estimated to be 1.4 weight %.

Example 6: Graphene Encapsulation Via Direct Transfer Vs. Chemical Production of Graphene Sheets Plus Freezer Milling A sample of graphene-embraced lithium titanate particles was prepared via the presently invented direct transfer method (using lithium titanate particles themselves as the milling media and natural graphite as the graphene source).

In a separate experiment, 10 grams of lithium titanate powder and 1 gram of reduced graphene oxide sheets (produced with the Hummer's method explained below) were placed in a freezer mill (Spex Mill, Spex Sample Prep, Metuchen N.J.) and processed for 10 minutes. In this experiment, graphite oxide as prepared by oxidation of graphite flakes with sulfuric acid, nitrate, and permanganate according to the method of Hummers [U.S. Pat. No. 2,798,878, Jul. 9, 1957]. Upon completion of the reaction, the mixture was poured into deionized water and filtered. The graphite oxide was repeatedly washed in a 5% solution of HCl to remove the majority of the sulfate ions. The sample was then washed repeatedly with deionized water until the pH of the filtrate was neutral. The slurry was spray-dried and placed in a vacuum oven at 60° C. for 24 hours. The interlayer spacing of the resulting laminar graphite oxide was determined by the Debey-Scherrer X-ray technique to be approximately 0.73 nm (7.3 Å). A sample of this material was subsequently transferred to a furnace pre-set at 650° C. for 4 minutes for exfoliation and heated in an inert atmosphere furnace at 1200° C. for 4 hours to create a low density powder comprised of few layer reduced graphene oxide (RGO). Surface area was measured via nitrogen adsorption BET.

As discussed in the Background section, there are seven (7) major problems associated with the chemical method of graphene production. In addition, the graphene sheets, once produced, tend to result in the formation of multiple-particle particulates that each contains a plurality of electrode active material particles embraced or encapsulated by graphene sheets. They appear to be incapable of encapsulating a single particle.

Example 7: Graphene-Encapsulated Lithium Iron Phosphate (LFP) as a Cathode Active Material for a Lithium Metal Battery LFP powder, un-coated or carbon-coated, is commercially available from several sources. The carbon-coated LFP powder and un-coated LFP powder samples were separately mixed with natural graphite particles in ball mill pots of a high-intensity ball mill apparatus. The apparatus was operated for 0.5 to 4 hours for each LFP material to produce graphene-encapsulated LFP particles, which were used as a cathode active material in the present study.

Example 8: Graphene-Encapsulated $V_2O_5$ as an Example of a Transition Metal Oxide Cathode Active Material of a Lithium Battery $V_2O_5$ powder is commercially available. A mixture of $V_2O_5$ powder and natural graphite (10/1 weight ratio) was sealed in each of 4 ball milling pots symmetrically positioned in a high-intensity ball mill. The mill was operated for 1 hour to produce particulates of graphene-encapsulated $V_2O_5$ particles, which were implemented as the cathode active material in a lithium metal battery.

Example 9: $LiCoO_2$ as an Example of Lithium Transition Metal Oxide Cathode Active Material for a Lithium-Ion Battery In a set of experiments, a mixture of $LiCoO_2$ powder and natural graphite (100/1-10/1 weight ratio) was sealed in each of 4 ball milling pots symmetrically positioned in a high-intensity ball mill. The mill was operated for 0.5-4 hours to produce particulates of graphene-encapsulated $LiCoO_2$ particles for use as a cathode active material.

Example 10: Organic Material ($Li_2C_6O_6$) as a Cathode Active Material of a Lithium Metal Battery The experiments associated with this example were conducted to determine if organic materials, such as $Li_2C_6O_6$, can be encapsulated in graphene sheets using the presently invented direct transfer method. The result is that organic active materials alone are typically incapable of peeling off graphene sheets from graphite particles. However, if a second active material (i.e. rigid particles of an inorganic material or a metal oxide/phosphate/sulfide) is implemented along with an organic active material in a ball milling pot, then the organic material particles and inorganic material particles can be separately or concurrently encapsulated to form graphene-encapsulated organic particles, graphene-encapsulated inorganic particles, and graphene-encapsulated mixture of organic and inorganic particles. This is interesting and surprising.

In order to synthesize dilithium rhodizonate ($Li_2C_6O_6$), the rhodizonic acid dihydrate (species 1 in the following scheme) was used as a precursor. A basic lithium salt, $Li_2CO_3$ can be used in aqueous media to neutralize both enediolic acid functions. Strictly stoichiometric quantities of both reactants, rhodizonic acid and lithium carbonate, were allowed to react for 10 hours to achieve a yield of 90%. Dilithium rhodizonate (species 2) was readily soluble even in a small amount of water, implying that water molecules are present in species 2. Water was removed in a vacuum at 180° C. for 3 hours to obtain the anhydrous version (species 3).

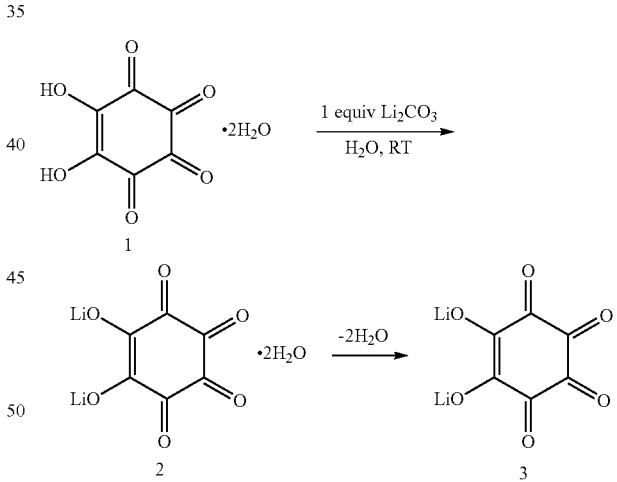

A mixture of an organic cathode active material ($Li_2C_6O_6$) and an inorganic cathode active material ($V_2O_5$ and $MoS_2$, separately) was ball-milled for 0.5-2.0 hours to obtain a mixture of graphene-encapsulated particles.

It may be noted that the two Li atoms in the formula $Li_2C_6O_6$ are part of the fixed structure and they do not participate in reversible lithium ion storing and releasing. This implies that lithium ions must come from the anode side. Hence, there must be a lithium source (e.g. lithium metal or lithium metal alloy) at the anode. Graphene-stabilized lithium metal particles prepared in Example 1 were used as an anode active material of the resulting lithium metal cell.

Example 11: Electrochemical Impregnation of S in Various Porous Carbon/Graphite Particles Activated artificial graphite particles were prepared for use as the sulfur cathode in a lithium-sulfur battery. The electrochemical impregnation of S into pores of activated artificial graphite particles was conducted by aggregating these particles into a loosely packed layer. In this approach, an anode, electrolyte, and a layer of such a loosely packed structure (serving as a cathode layer) are positioned in an external container outside of a lithium-sulfur cell. The needed apparatus is similar to an electro-plating system, which is well-known in the art.

In a typical procedure, a metal polysulfide ($M_xS_y$) was dissolved in a solvent (e.g. mixture of DOL/DME in a volume ratio from 1:3 to 3:1) to form an electrolyte solution. An amount of a lithium salt may be optionally added, but this is not required for external electrochemical deposition. A wide variety of solvents can be utilized for this purpose and there is no theoretical limit to what type of solvents can be used; any solvent can be used provided that there is some solubility of the metal polysulfide in this desired solvent. A greater solubility would mean a larger amount of sulfur can be derived from the electrolyte solution.

The electrolyte solution was then poured into a chamber or reactor under a dry and controlled atmosphere condition (e.g. He or nitrogen gas). A metal foil was used as the anode and a layer of the porous structure as the cathode; both being immersed in the electrolyte solution. This configuration constitutes an electrochemical impregnation and deposition system. The step of electrochemically impregnating sulfur into pores was conducted at a current density in the range from 1 mA/g to 10 A/g, based on the layer weight of the porous carbon/graphite particles/fibers.

The chemical reactions that occur in this reactor may be represented by the following equation: $M_xS_y \rightarrow M_xS_{y-z} + zS$ (typically z=1-4). The sulfur coating thickness or particle diameter and the amount of S coating/particles impregnated may be controlled by the electrochemical reaction current density, temperature and time. In general, a lower current density and lower reaction temperature lead to a more uniform impregnation of S and the reactions are easier to control. A longer reaction time leads to a larger amount of S saturated in the pores. Additionally, the electrochemical method is capable of rapidly converting the impregnated S into metal polysulfide (lithium polysulfide, sodium polysulfide, and potassium polysulfide, etc.).

In the present study, two types of lithium anode were used. One contains conventional lithium metal foil laminated on Cu foil surface and the other contains a layer of graphene-stabilized lithium metal particles, also coated onto a Cu foil as a main current collector.

Example 12: Preparation and Electrochemical Testing of Various Battery Cells For most of the anode and cathode active materials investigated, we prepared lithium-ion cells or lithium metal cells using the conventional slurry coating method. A typical anode composition includes 85 wt. % active material (e.g., graphene-encapsulated Si or $Co_3O_4$ particles), 7 wt. % acetylene black (Super-P), and 8 wt. % polyvinylidene fluoride binder (PVDF, 5 wt. % solid content) dissolved in N-methyl-2-pyrrolidinoe (NMP). After coating the slurries on Cu foil, the electrodes were dried at 120° C. in vacuum for 2 h to remove the solvent. With the instant method, typically no binder resin is needed or used, saving 8% weight (reduced amount of non-active materials). Cathode layers are made in a similar manner (using Al foil as the cathode current collector) using the conventional slurry coating and drying procedures. An anode layer, separator layer (e.g. Celgard 2400 membrane), and a cathode layer are then laminated together and housed in a plastic-Al envelop. The cell is then injected with 1 M $LiPF_6$ electrolyte solution dissolved in a mixture of ethylene carbonate (EC) and diethyl carbonate (DEC) (EC-DEC, 1:1 v/v). In some cells, ionic liquids were used as the liquid electrolyte. The cell assemblies were made in an argon-filled glove-box.

The cyclic voltammetry (CV) measurements were carried out using an Arbin electrochemical workstation at a typical scanning rate of 1 mV/s. In addition, the electrochemical performances of various cells were also evaluated by galvanostatic charge/discharge cycling at a current density of from 50 mA/g to 10 A/g. For long-term cycling tests, multi-channel battery testers manufactured by LAND were used.

Figure 4:
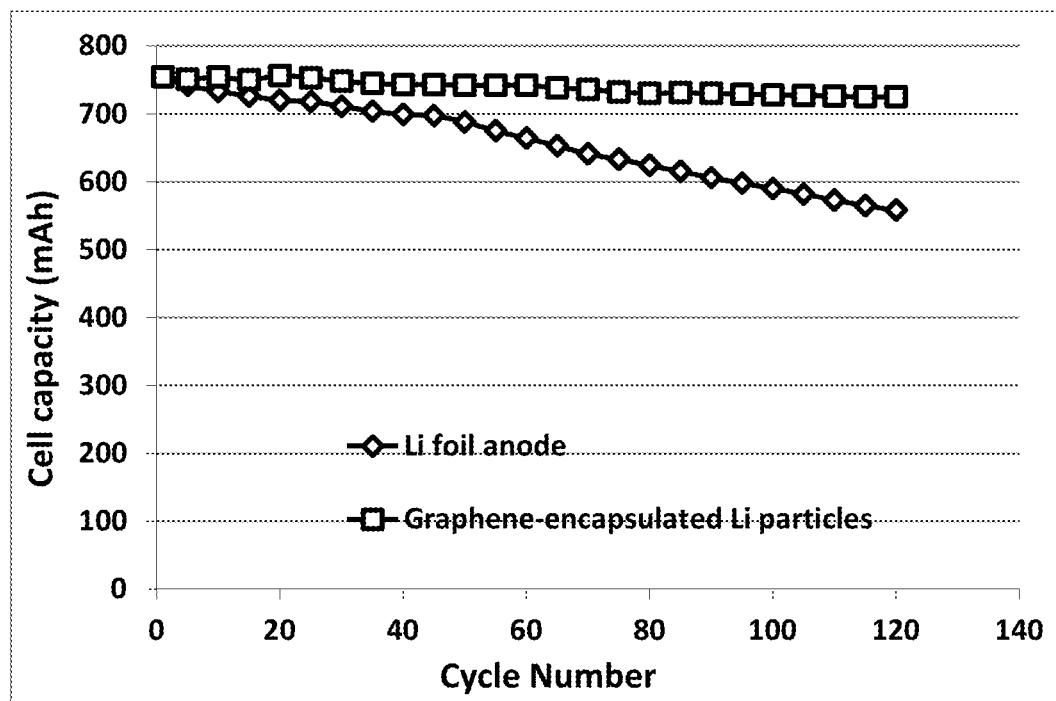
FIG. 4 Charge-discharge cycling behaviors of two lithium cells featuring graphene-embraced Li$_2$C$_6$O$_6$ particle-based cathode active materials: one cell containing lithium foil-based anode active material layer and the other graphene-stabilized lithium metal particles as the anode active material.

Shown in FIG. 4 are charge-discharge cycling behaviors of two lithium cells each featuring graphene-embraced $Li_2C_6O_6$ particle-based cathode active materials. One cell contains conventional lithium foil-based anode active material layer at the anode. The other cell contains presently invented graphene-stabilized lithium metal particles as the anode active material. The surface stabilized lithium metal particles can be mixed into a slurry for the preparation of a lithium metal anode using the commonly practiced slurry coating process. These testing results indicate that the graphene surface stabilization strategy not only makes it safer to handle the lithium metal anode but also enable the lithium metal secondary battery to be charged and recharged for a large number of cycles without exhibiting a dendrite-related issue or any lithium metal degradation phenomena (e.g. the formation of "dead lithium particles" near the lithium metal-electrolyte interface commonly observed in the conventional Li metal cell).

Figure 5:
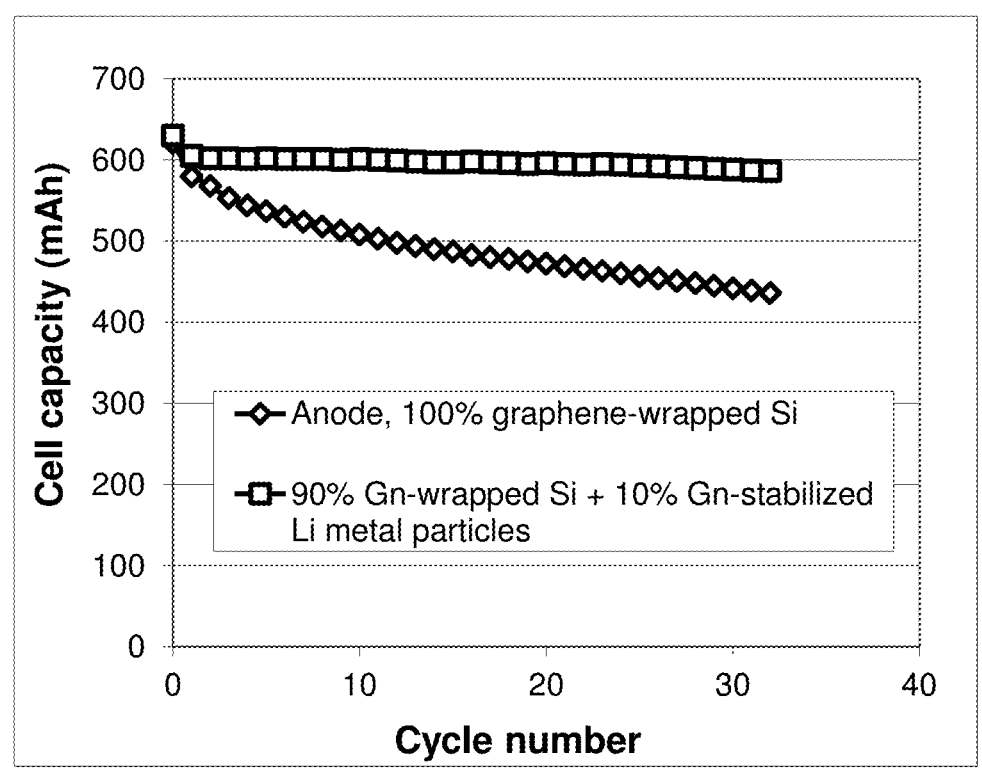
FIG. 5 Charge-discharge cycling behaviors of 2 lithium-ion cells containing lithium nickel cobalt aluminum (NCA) as the cathode active material: one cell containing graphene-encapsulated Si particles as the anode active material and the other cell containing 90% graphene-encapsulated Si particles+10% graphene-stabilized lithium metal particles as the anode active material.

FIG. 5 shows the charge-discharge cycling behaviors of 2 lithium-ion cells containing lithium nickel cobalt aluminum (NCA) as the cathode active material: one cell containing graphene-encapsulated Si particles as the anode active material and the other cell containing 90% graphene-encapsulated Si particles+10% graphene-stabilized lithium metal particles as the anode active material. These results have demonstrated that a small amount of graphene-stabilized lithium metal particles enable the lithium-ion cell containing a Si-based high-capacity anode to maintain relatively stable charge/discharge cycling behavior.

Figure 6:
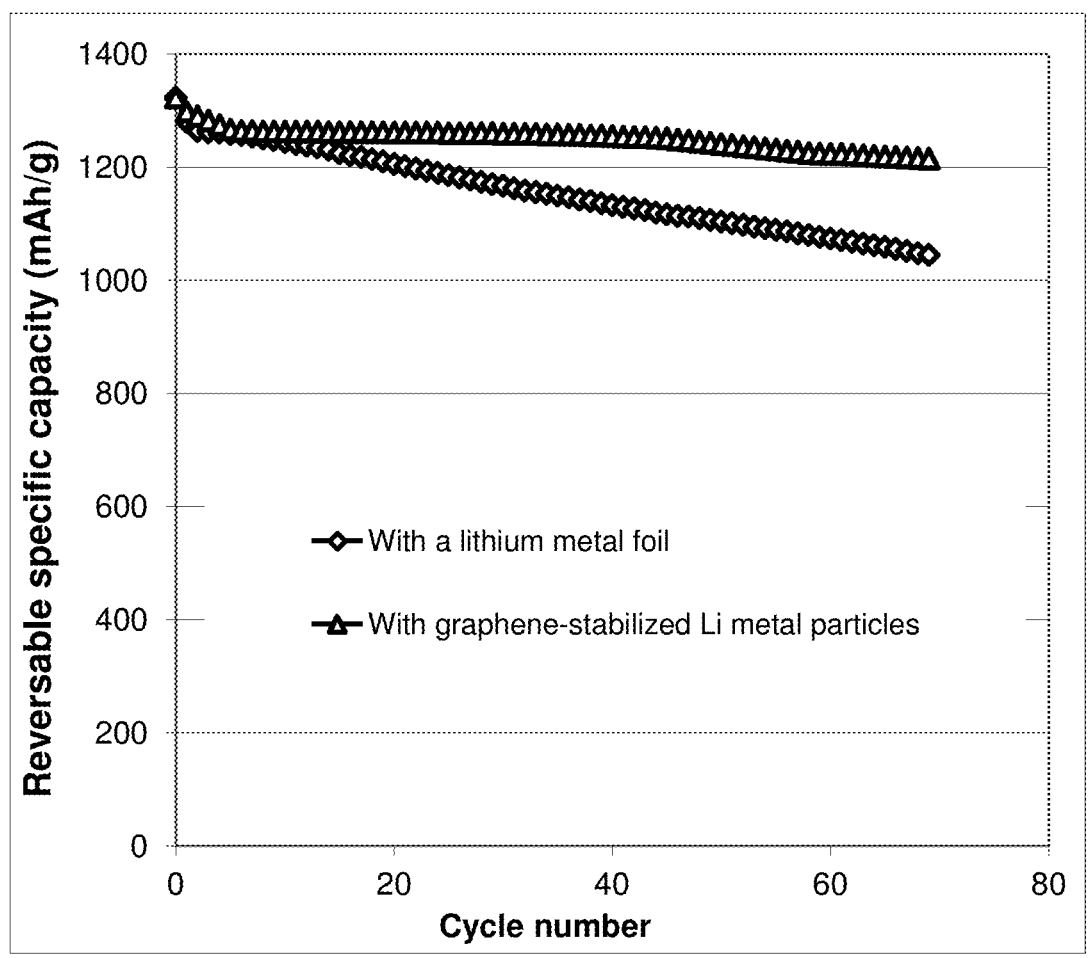
FIG. 6 Charge-discharge cycling behaviors of 2 lithium-sulfur cells featuring activated artificial graphite particles having electrochemically impregnated sulfur as the cathode active material and two separate types of lithium anodes: one containing conventional lithium metal foil laminated on Cu foil surface and the other containing a layer of graphene-stabilized lithium metal particles, also coated onto a Cu foil as a main current collector.

FIG. 6 shows the charge-discharge cycling behaviors of 2 lithium-sulfur cells featuring activated artificial graphite particles having electrochemically impregnated sulfur as the cathode active material and two separate types of lithium anodes: one containing conventional lithium metal foil laminated on Cu foil surface and the other containing a layer of graphene-stabilized lithium metal particles, also coated onto a Cu foil as a main current collector. The graphene surface stabilization strategy enables the lithium-sulfur cell to provide a stable power source.

The invention claimed is:

1. A method of producing graphene-stabilized lithium metal particles directly from a graphitic material, said method comprising:
   a) mixing multiple particles of a graphitic material, multiple polymer-coated solid particles of a lithium-attracting seed material, and optional ball-milling media to form a mixture in an impacting chamber of an energy impacting apparatus, wherein said impacting chamber contains therein no previously produced isolated graphene sheets;

b) operating said energy impacting apparatus with a frequency and an intensity for a length of time sufficient for peeling off graphene sheets from said particles of graphitic material and transferring said peeled graphene sheets to surfaces of said polymer-coated particles and fully embrace or encapsulate said particles to produce graphene-embraced or graphene-encapsulated polymer-coated solid particles inside said impacting chamber;

c) recovering said graphene-embraced or graphene-encapsulated polymer-coated solid particles from said impacting chamber and removing said polymer from said particles to produce graphene balls, wherein at least one of said graphene balls has a graphene shell, a lithium-attracting seed material particle and a hollow space; and d) impregnating said graphene balls with lithium metal to obtain said graphene-stabilized lithium metal particles.

2. The method of claim 1, further comprising a step of incorporating said graphene-stabilized lithium metal particles into a battery electrode.

3. The method of claim 1, wherein said lithium-attracting seed material is selected from a metal, a metalloid, carbon, graphite, metal oxide, or a combination thereof.

4. The method of claim 1, wherein said lithium-attracting seed material contains a metal selected from the group consisting of Au, Ag, Mg, Zn, Ti, Na, K, Al, Fe, Mn, Co, Ni, V, Cr, an alloy thereof, and combinations thereof.

5. The method of claim 1, wherein said lithium-attracting seed material contains a metalloid selected from the group consisting of Si, Ge, Sn, Pb, B, Al, Ga, In, Sb, Bi, and combinations thereof.

6. The method of claim 1, wherein said lithium-attracting seed material contains a metal oxide selected from $SiO_x$ (0.1<x<1.9), GeO, $SnO_2$, or a transition metal oxide.

7. The method of claim 1, wherein said step of removing said polymer from said particles comprises a procedure selected from melting said polymer, dissolving said polymer with a solvent, or heat-treating/pyrolyzing said polymer.

8. The method of claim 1, wherein said step of removing said polymer from said particles comprises a procedure of heat-treating or pyrolyzing said polymer at a temperature from 300° C. to 1,500° C. to convert said polymer into a carbon material that bonds said graphene sheets together.

9. The method of claim 1, wherein said step of impregnating said graphene balls with lithium metal comprises a procedure of melt impregnation, solution impregnation, chemical impregnation, or electrochemical impregnation.

10. The method of claim 1, wherein said graphitic material is selected from the group consisting of natural graphite, synthetic graphite, highly oriented pyrolytic graphite, graphite fiber, graphitic nanofiber, graphite fluoride, chemically modified graphite, mesocarbon microbead, partially crystalline graphite, and combinations thereof.

11. The method of claim 1, wherein the energy impacting apparatus is a vibratory ball mill, planetary ball mill, high energy mill, basket mill, agitator ball mill, cryogenic ball mill, micro ball mill, tumbler ball mill, continuous ball mill, stirred ball mill, pressurized ball mill, plasma-assisted ball mill, freezer mill, vibratory sieve, bead mill, nano bead mill, ultrasonic homogenizer mill, centrifugal planetary mixer, vacuum ball mill, or resonant acoustic mixer.

12. The method of claim 1 wherein said graphene sheets contain single-layer graphene sheets.

13. The method of claim 1, wherein said procedure of operating said energy impacting apparatus is conducted in a continuous manner using a continuous energy impacting device.

14. A battery electrode containing said graphene-stabilized lithium metal particles produced in claim 1.

15. A battery or a lithium-ion capacitor containing the battery electrode of claim 14.

16. A lithium-ion battery comprising an anode, an electrolyte, and a cathode, wherein said anode comprises said graphene-stabilized lithium metal particles of claim 1 as a lithium source and an anode active material selected from the group consisting of: (A) lithiated and un-lithiated silicon (Si), germanium (Ge), tin (Sn), lead (Pb), antimony (Sb), bismuth (Bi), zinc (Zn), aluminum (Al), titanium (Ti), nickel (Ni), cobalt (Co), and cadmium (Cd); (B) lithiated and un-lithiated alloys or intermetallic compounds of Si, Ge, Sn, Pb, Sb, Bi, Zn, Al, Ti, Ni, Co, or Cd with other elements; (C) lithiated and un-lithiated oxides, carbides, nitrides, sulfides, phosphides, selenides, and tellurides of Si, Ge, Sn, Pb, Sb, Bi, Zn, Al, Ti, Fe, Ni, Co, or Cd, and their mixtures, composites, or lithium-containing composites; (D) lithiated and un-lithiated salts and hydroxides of Sn; (E) lithium titanate, lithium manganate, lithium aluminate, lithium-containing titanium oxide, lithium transition metal oxide; (F) lithiated and un-lithiated carbon or graphite particles; and (G) combinations thereof.

17. A battery containing the graphene-stabilized lithium metal particles produced in claim 1 as an electrode active material, wherein said battery is a lithium-ion battery, lithium metal secondary battery, lithium-sulfur battery, lithium-air battery, or lithium-selenium battery.

\* \* \* \* \*